(12) United States Patent
Adeyemi et al.

(10) Patent No.: US 12,163,815 B2
(45) Date of Patent: Dec. 10, 2024

(54) METHODS AND SYSTEMS FOR PROVIDING ACCESS TO INTERFEROMETRIC SYSTEM DATA

(71) Applicant: HIFI ENGINEERING INC., Calgary (CA)

(72) Inventors: Adekunle Adeyemi, Calgary (CA); Seyed Ehsan Jalilian, Calgary (CA)

(73) Assignee: HIFI ENGINEERING INC., Calgary (CA)

( * ) Notice: Subject to any disclaimer, the term of this patent is extended or adjusted under 35 U.S.C. 154(b) by 692 days.

(21) Appl. No.: 16/634,722

(22) PCT Filed: Jul. 27, 2018

(86) PCT No.: PCT/CA2018/050920
§ 371 (c)(1),
(2) Date: Jan. 28, 2020

(87) PCT Pub. No.: WO2019/018947
PCT Pub. Date: Jan. 31, 2019

(65) Prior Publication Data
US 2020/0200943 A1    Jun. 25, 2020

Related U.S. Application Data

(60) Provisional application No. 62/538,573, filed on Jul. 28, 2017.

(51) Int. Cl.
*G01D 9/00* (2006.01)
*E21B 47/117* (2012.01)
(Continued)

(52) U.S. Cl.
CPC ............ *G01D 9/005* (2013.01); *E21B 47/117* (2020.05); *F17D 3/01* (2013.01); *G01V 8/24* (2013.01); *G01V 9/005* (2013.01)

(58) Field of Classification Search
CPC ........ G01V 9/005; G01V 8/24; E21B 47/117; F17D 3/01; G01D 5/35306
See application file for complete search history.

(56) References Cited

U.S. PATENT DOCUMENTS 5,204,965 A    4/1993   Guthery et al.
8,135,862 B2   3/2012   Singh et al.
(Continued)

FOREIGN PATENT DOCUMENTS

CA    2274915 A1    7/1998
CA    2373576 A1    12/2000
(Continued)

*Primary Examiner* — Mohamed Charioui
*Assistant Examiner* — Dacthang P Ngo
(74) *Attorney, Agent, or Firm* — D'Ambrosio & Menon, PLLC; Usha Menon

(57) ABSTRACT

A computer-implemented method of providing access to interferometric system data stored in a data repository. A query that includes a data parameter identifier is received. The data repository is accessed and the interferometric system data is stored in the data repository using a data structure that has one or more data parameter arrays and one or more corresponding data group members. Each data group member includes one or more data arrays each associated with a data parameter in the corresponding data parameter array. Using the data parameter identifier, one or more target data parameters are determined from among the one or more data parameter arrays. One or more target data arrays that correspond to the one or more target data parameters are determined from among the one or more data arrays. The interferometric system data, which is in the one or more target data arrays, is extracted.

19 Claims, 9 Drawing Sheets

(51) Int. Cl.
  *F17D 3/01*    (2006.01)
  *G01V 8/24*    (2006.01)
  *G01V 9/00*    (2006.01)

(56) References Cited

U.S. PATENT DOCUMENTS

| | | | |
|---|---|---|---|
| 2005/0149265 A1* | 7/2005 | Reniska | G01V 1/46 |
| | | | 702/6 |
| 2008/0208475 A1* | 8/2008 | Karr | G06F 16/26 |
| | | | 702/6 |
| 2013/0085690 A1* | 4/2013 | Fei | G06F 17/18 |
| | | | 702/51 |
| 2014/0326860 A1* | 11/2014 | Choi | G01D 5/35306 |
| | | | 250/227.11 |
| 2020/0032644 A1* | 1/2020 | Xia | G01D 5/35358 |

FOREIGN PATENT DOCUMENTS

| | | | |
|---|---|---|---|
| CA | 2523463 | A1 | 11/2004 |
| CA | 2984472 | A1 | 10/2016 |
| WO | WO 2017/147679 | * | 9/2017 |

* cited by examiner

METHODS AND SYSTEMS FOR PROVIDING ACCESS TO INTERFEROMETRIC SYSTEM DATA

FIELD OF THE DISCLOSURE

The present disclosure relates to methods and systems for providing access to interferometric system data, in particular sensor and event data recorded from a pipeline or a wellbore. The disclosure also relates to methods and systems for updating such interferometric system data.

BACKGROUND TO THE DISCLOSURE

Fiber optic cables are often used for distributed measurement systems in acoustic sensing applications. Acoustic sensors may be formed by wrapping a segment of fiber optic cable around a core. The length of cable wrapped around the core affects the sensitivity of the sensor.

Pressure changes, due to sound waves for example, in the space immediately surrounding an optical fiber and that encounter the optical fiber, cause dynamic strain in the optical fiber. Optical interferometry may be used to detect the dynamic strain along a segment of the fiber. Optical interferometry is a technique in which two separate light pulses, a sensing pulse and a reference pulse, are generated and interfere with each other. The sensing and reference pulses may, for example, be directed along an optical fiber that comprises fiber Bragg gratings on either side of the core around which the optical fiber wraps. The fiber Bragg gratings partially reflect the pulses back towards an optical receiver at which an interference pattern is observed.

The nature of the interference pattern observed at the optical receiver provides information on the optical path length the pulses traveled, which in turn provides information on parameters such as the strain experienced by the segment of optical fiber between the fiber Bragg gratings. Information on the strain then provides information about the event that caused the strain.

Large volumes of optical fiber data can be collected from pipelines on a daily basis. Processing and visualizing the results from this data remains a challenging task. Many pipelines are located in remote locations with limited or intermittent network connectivity, and it is generally not feasible to transfer such massive volumes of data from the field to the pipeline company's offices. Furthermore, the pipeline operator generally does not have the bandwidth to analyze all the data in its raw form.

The present disclosure seeks to address at least some of these problems in the art.

SUMMARY OF THE DISCLOSURE

In accordance with an aspect of the disclosure, there is provided a computer-implemented method of providing access to interferometric system data stored in a data repository. The method comprises receiving a query for accessing interferometric system data. The query comprises a data parameter identifier. The method further comprise accessing the data repository. The interferometric system data is stored in the data repository according to a data structure comprising one or more data parameter arrays and one or more corresponding data group members. Each data group member comprises one or more data arrays each associated with a data parameter in the corresponding data parameter array. The one or more data arrays comprise the interferometric system data. The method further comprises determining, using the data parameter identifier, one or more target data parameters from among the one or more data parameter arrays. The method further comprises determining one or more target data arrays from among the one or more data arrays. The one or more target data arrays correspond to the one or more target data parameters. The method further comprises extracting the interferometric system data comprised in the one or more target data arrays.

Each data parameter array may comprise a timestamp array having one or more timestamps. Each data parameter may comprise one of the timestamps. In this case, the data parameter identifier may comprise a monitoring period identifier for identifying a period of interest (identifiable from one or more timestamps) from which a user is interested in extracting interferometric system data.

Each data parameter array may comprise a channel number array having one or more channel numbers. Each data parameter may comprise one of the channel numbers, each channel number indicating a position. For example, the position may comprise a position along a wellbore or a pipeline. The data parameter identifier may comprise a channel number identifier for identifying one or more channel numbers. The channel numbers may relate to positions along a pipeline or a wellbore from which a user is interested in extracting interferometric system data.

The data structure may comprise the one or more timestamp arrays and the one or more channel number arrays.

Thus, in addition to dereferencing using timestamps, another parameter that can be used may be channel number, e.g. a location along the pipeline/wellbore. For example, if each channel is 10 m long, then a 100 km pipeline has 10,000 channels. The user may be interested in seeing the data at a particular location along the pipeline, such as at a river crossing over a specific period of time. Thus, the user may specify the channels of interest to be channels 500-520 (say 200 m), in addition to specifying the time period of interest to be the last 24 hours.

Extracting the interferometric system data may comprise accessing the interferometric system data.

The method may further comprise using one or more sensors to monitor data from one or more wellbores or one or more pipelines. The method may further comprise formatting the data into data blocks and corresponding data parameters, the data blocks comprising the interferometric system data. The interferometric system data may comprise at least the data obtained from the one or more sensors. The method may further comprise storing the data blocks and corresponding data parameters in the data repository according to the data structure. Each data array may comprise one or more of the data blocks.

Thus, each data array may comprise one or more data blocks. Similarly, each data parameter array may comprise one or more data parameters. For example, in the case of interferometric system data relating to simulated strain testing, each data block in the data array may contain a single binary or Boolean parameter (e.g. pass/fail), indicating whether the simulated strain testing which took place at the time of the corresponding timestamp, or at the position indicated by the corresponding channel number, was successful or not. In another example, in the case of interferometric system data relating to optical power, the data array may contain an array of values for the optical power emitted by the interrogator as a function of the time at which updated information on optical power was received.

The one or more sensors may comprise optical fiber positioned within acoustic proximity of the one or more wellbores or the one or more pipelines.

The data structure may further comprise one or more data groups each comprising one or more of the data group members. The query may further comprise a data group identifier identifying one or more target data groups from among the one or more data groups. The step of determining the one or more target data arrays may comprise determining, using the data group identifier, one or more target data arrays from among the one or more data arrays. The one or more target data arrays may be comprised in the one or more target data groups.

The query may further comprise a data summary identifier. The method may further comprise, based on the data summary identifier, pre-processing the one or more target data arrays.

The step of pre-processing may comprise determining one or more averages of data comprised in one or more data blocks of the one or more target data arrays.

The method may further comprise determining if a number of data blocks in each of the target data arrays is above a threshold. If not, then the method may further comprise not extracting the interferometric system data comprised in the target data array.

Each of the steps may be carried out at one or more remote computing systems. The method may further comprise sending the extracted interferometric system data to a local computing device communicatively coupled to at least one of the one or more computing systems.

The local computing device may be communicatively coupled to the at least one of the one or more computing systems via a web portal.

The step of receiving the query may comprise receiving multiple such queries. Each query may be sent from a different computing device communicatively coupled to at least one of the one or more computing systems. Each of the steps may be carried out in respect of each query.

Each data group may comprise interferometric system data relating to one of the following: acoustic loudness, raw strain, filtered strain, spectral content, strength of harmonics, source-separated powers, and optical signal quality indicators.

The method may further comprise, prior to extracting the interferometric system data, formatting the extracted interferometric system data. The method may further comprise sending the formatted interferometric system data to a computing device that initiated the query.

The method may further comprise sending the extracted interferometric system data to a computing device that initiated the query.

The interferometric system data may comprise sensor data comprising data obtained by using one or more sensors to monitor one or more wellbores or one or more pipelines. The interferometric system data may comprise event data comprising data relating to one or more events detected at one or more wellbores or one or more pipelines. The interferometric system data may comprise diagnostic data comprising data relating to one or more optical fiber interrogators used for interrogating optical fiber positioned within acoustic proximity of one or more wellbores or one or more pipelines.

In the case where the interferometric system data comprises sensor data comprising data obtained by using one or more sensors to monitor one or more wellbores or one or more pipelines, the method may further comprise processing the sensor data in order to obtain event data comprising data relating to one or more events detected at one or more wellbores or one or more pipelines. The method may further comprise sending an event identification notification comprising an indication of the event.

In a further aspect of the disclosure, there is provided a computing device comprising one or more processors. The one or more processors are configured to receive a query for accessing interferometric system data. The query comprises a data parameter identifier. The one or more processors are further configured to access a data repository. The interferometric system data is stored in the data repository according to a data structure comprising one or more data parameter arrays and one or more corresponding data group members. Each data group member comprises one or more data arrays each associated with a data parameter in the corresponding data parameter array. The one or more data arrays comprise the interferometric system data. The one or more processors are further configured to determine, using the data parameter identifier, one or more target data parameters from among the one or more data parameter arrays. The one or more processors are further configured to determine one or more target data arrays from among the one or more data arrays. The one or more target data arrays correspond to the one or more target data parameters. The one or more processors are further configured to extract the interferometric system data comprised in the one or more target data arrays.

The one or more processors may be further configured to format the extracted interferometric system data. The one or more processors may be further configured to send the formatted interferometric system data to a further computing device that initiated the query.

The interferometric system data may comprise sensor data comprising data obtained by using one or more sensors to monitor one or more wellbores or one or more pipelines. The interferometric system data may comprise event data comprising data relating to one or more events detected at one or more wellbores or one or more pipelines. The interferometric system data may comprise diagnostic data comprising data relating to one or more optical fiber interrogators used for interrogating optical fiber positioned within acoustic proximity of one or more wellbores or one or more pipelines.

In a further aspect of the disclosure, there is provided a system for providing access to interferometric system data stored in a data repository. The system comprises one or more remote servers. The system further comprise a local computing device communicatively coupled to the one or more servers. The local computing device comprises one or more processors and a graphical user interface. The one or more processors are configured to send to the one or more servers a query for accessing interferometric system data. The query comprises a data parameter identifier. The one or more servers are configured to access the data repository. The interferometric system data is stored in the data repository according to a data structure comprising one or more data parameter arrays and one or more corresponding data group members. Each data group member comprises one or more data arrays each associated with a data parameter in the corresponding data parameter array. The one or more data arrays comprise the interferometric system data. The one or more servers are further configured to determine, using the data parameter identifier, one or more target data parameters from among the one or more data parameter arrays. The one or more servers are further configured to determine one or more target data arrays from among the one or more data arrays. The one or more target data arrays corresponding to the one or more target data parameters. The one or more servers are further configured to extract the interferometric system data comprised in the one or more target data arrays.

The one or more servers may be further configured to format the extracted interferometric system data for display on the graphical user interface, and send the formatted interferometric system data to the local computing device.

The one or more processors may be further configured to format the interferometric system data for display on the graphical user interface.

The local computing device may be communicatively coupled to the one or more servers via a web portal.

The interferometric system data may comprise sensor data comprising data obtained by using one or more sensors to monitor one or more wellbores or one or more pipelines. The interferometric system data may comprise event data comprising data relating to one or more events detected at one or more wellbores or one or more pipelines. The interferometric system data may comprise diagnostic data comprising data relating to one or more optical fiber interrogators used for interrogating optical fiber positioned within acoustic proximity of one or more wellbores or one or more pipelines.

In a further aspect of the disclosure, there is provided a computer-implemented method of updating interferometric system data stored in a data repository. The method comprises using one or more sensors to monitor data from one or more wellbores or one or more pipelines. The method further comprises formatting the data into data blocks comprising interferometric system data and corresponding data parameters. The interferometric system comprises at least sensor data obtained from the one or more sensors. The method further comprises storing the data blocks and corresponding data parameters in the data repository according to a data structure comprising one or more data parameter arrays and one or more corresponding data group members. Each data group member comprises one or more data arrays each associated with a data parameter in the corresponding data parameter array. Each data array comprises one or more of the data blocks.

The one or more sensors may comprise optical fiber positioned within acoustic proximity of the one or more wellbores or the one or more pipelines.

The method may further comprise, prior to formatting the data, sending the data to one or more servers. The steps of formatting the data, and storing the data blocks and corresponding data parameters, may be carried out by the one or more servers.

The method may further comprise, prior to storing the data blocks and corresponding data parameters, sending the data blocks and corresponding data parameters to one or more servers. The steps of formatting the data, and storing the data blocks and corresponding data parameters, may be carried out by the one or more servers.

The step of formatting the data, or the step of sending the data blocks and the corresponding data parameters, may be carried out periodically.

The method may further comprise determining if the one or more sensors have monitored new data from the one or more wellbores or the one or more pipelines.

The interferometric system data may comprise event data comprising data relating to one or more events detected at one or more wellbores or one or more pipelines. The interferometric system data may comprise diagnostic data comprising data relating to one or more optical fiber interrogators used for interrogating optical fiber positioned within acoustic proximity of one or more wellbores or one or more pipelines. The method may further comprise measuring data from the one or more optical fiber interrogators.

The method may further comprise further formatting the data into the data blocks such that the data blocks further comprise the diagnostic data.

In a further aspect of the disclosure, there is provided a system for monitoring and storing interferometric system data in a data repository. The system comprises one or more sensors configured to monitor data from one or more wellbores or one or more pipelines. The system further comprises a computing system communicatively coupled to the one or more sensors and comprising one or more processors, a data repository and a graphical user interface. The one or more processors are configured to format the data into data blocks comprising interferometric system data comprising at least the sensor data and corresponding data parameters. The one or more processors are further configured to store the data blocks and corresponding data parameters in the data repository according to a data structure comprising one or more data parameter arrays and one or more corresponding data group members. Each data group member comprises one or more data arrays each associated with a data parameter in the corresponding data parameter array. Each data array comprises one or more of the data blocks.

The one or more sensors may comprise optical fiber positioned within acoustic proximity of the one or more wellbores or the one or more pipelines.

The interferometric system data may comprise event data comprising data relating to one or more events detected at one or more wellbores or one or more pipelines. The interferometric system data may comprise diagnostic data comprising data relating to one or more optical fiber interrogators used for interrogating optical fiber positioned within acoustic proximity of one or more wellbores or one or more pipelines. The data in the data blocks may be further formatted such that the data blocks further comprise the diagnostic data.

In a further aspect of the disclosure, there is provided a system for providing access to interferometric system data stored in a data repository. The system comprises one or more sensors configured to monitor data from one or more pipelines or one or more wellbores. The system further comprises a remote computing system communicatively coupled to the one or more sensors and configured to receive and format the data into data blocks and corresponding data parameters. The data blocks comprise interferometric system data comprising at least the sensor data. The remote computing system is further configured to store the data blocks and corresponding data parameters in the data repository according to a data structure comprising one or more data parameter arrays and one or more corresponding data group members. Each data group member comprises one or more data arrays each associated with a data parameter in the corresponding data parameter array. Each data array comprises one or more of the data blocks. The system further comprise a local computing device communicatively coupled to the remote computing system and configured to send to the remote computing system a query for accessing the interferometric system data. The query comprises a data parameter identifier. The remote computing system is configured to determine, using the data parameter identifier, one or more target data parameters from among the one or more data parameter arrays. The remote computing system is further configured to determine one or more target data arrays from among the one or more data arrays. The one or more target data arrays correspond to the one or more target data parameters. The remote computing system is further configured to extract the interferometric system data comprised in the one or more target data arrays.

The local computing device may be communicatively coupled to the remote computing system via a web portal.

The one or more sensors may comprise optical fiber positioned within acoustic proximity of the one or more wellbores or the one or more pipelines.

The remote computing system may be further configured to format the extracted interferometric system data. The remote computing system may be further configured to send the formatted interferometric system data to the local computing device.

In a further aspect of the disclosure, there is provided a computer-readable medium having instructions stored thereon. The instructions are configured when read by one or more processors to cause the one or more processors to carry out any of the methods described herein.

BRIEF DESCRIPTION OF THE DRAWINGS

Specific embodiments of the disclosure will now be described in conjunction with the accompanying drawings, of which.

DETAILED DESCRIPTION OF SPECIFIC EMBODIMENTS

The present disclosure seeks to provide methods and systems for providing access to, and updating, interferometric system data. While various embodiments of the disclosure are described below, the disclosure is not limited to these embodiments, and variations of these embodiments may well fall within the scope of the disclosure which is to be limited only by the appended claims.

Figure 1:
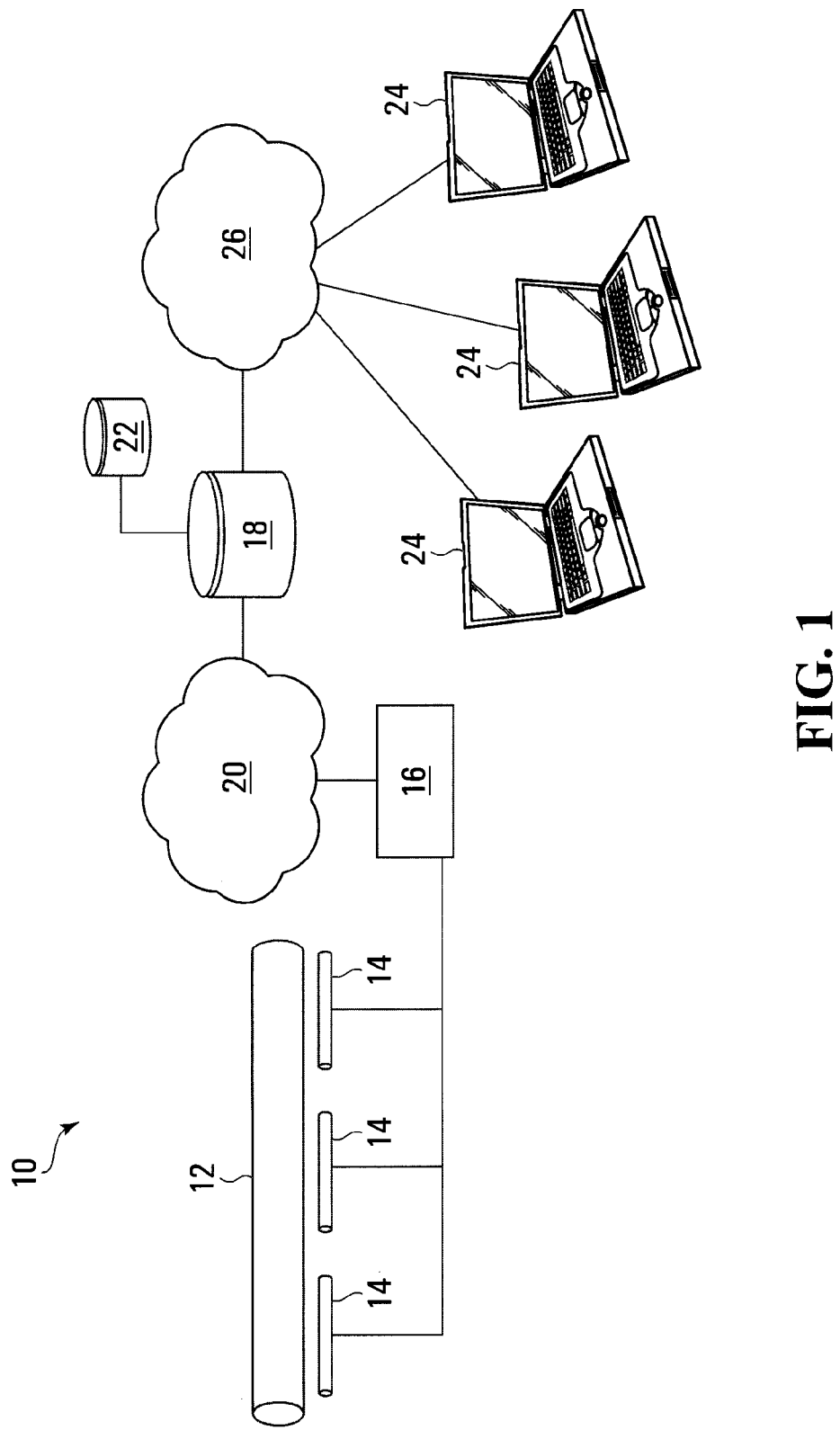
FIG. 1 is a schematic representation of a system for providing access to, and updating, interferometric system data, in accordance with an embodiment of the disclosure.

In accordance with an embodiment of the disclosure, FIG. 1 shows a system 10 for providing to a requesting device access to interferometric system data. System 10 is also configured to update the interferometric system data in a data repository. System 10 includes a pipeline 12 for transporting for a fluid such as oil. Adjacent pipeline 12 are a number of optical fiber segments 14 located within acoustic proximity of pipeline 12. In particular, optical fiber segments 14 are positioned so as to enable optical fiber interferometry of acoustic waves from pipeline 12, as described above. It should be noted that although system 10 has been described with optical fiber being used to monitor pipeline 12, in other embodiments other types of sensors may be used to monitor pipeline 12. Furthermore, in other embodiments, sensors (such as optical fiber) may be used to monitor data from a wellbore as opposed to a pipeline.

System 10 further includes a processing and relay system 16 communicatively coupled to optical fiber segments 14. Processing and relay system 16 is configured to receive monitored data from optical fiber segments 14, and includes one or more processors and associated memory for recording the data received from optical fiber segments 14. Processing and relay system 16 is in turn communicatively coupled to a backend server 18 via a network 20, such as the Internet. Although only one server is shown in FIG. 1, in other embodiments system 10 may include more than one server, each server being either separately or collectively communicative with processing and relay system 16. Sever 18 includes one or more processors and a data repository 22. In other embodiments, server 18 and data repository 22 may be separate components, and server 18 may be configured to access, read and write data to data repository 22. Server 18 is configured to receive recorded sensor data from processing and relay system 16, and store the sensor data in data repository 22 according to a data structure illustrated in FIG. 2. One or more local computing devices 24, such as a user's mobile device, are communicatively linked to backend server 18 via a network 26, such as the Internet. Each local computing device 24 may communicate with server 18 in order to obtain access to data stored within data repository 22, in accordance with methods described herein.

In accordance with the embodiments described herein, the interferometric system data may comprise sensor data comprising data obtained by using the sensors to monitor pipeline 12. The interferometric system data may also comprise event data comprising data relating to one or more events detected at pipeline 12. For example, the sensor data may be processed so as to identify one or more events in pipeline 12 (such as leaks). The interferometric system data may also comprise diagnostic data comprising data relating to one or more optical fiber interrogators (which may be comprised in processing and relay system 16) used for interrogating the optical fiber. Thus, the diagnostic data is not necessarily linked to the sensor data, but may nonetheless be obtained by monitoring characteristics (e.g. optical power output) of the one or more optical fiber interrogators and storing the data in a data array as described below. In any embodiment, sensor data, event data and diagnostic data (more generally, interferometric system data) may be stored alongside one another in the data array described in more detail below. Furthermore, other types of data may be stored in the data array described in more detail below.

Figure 2:
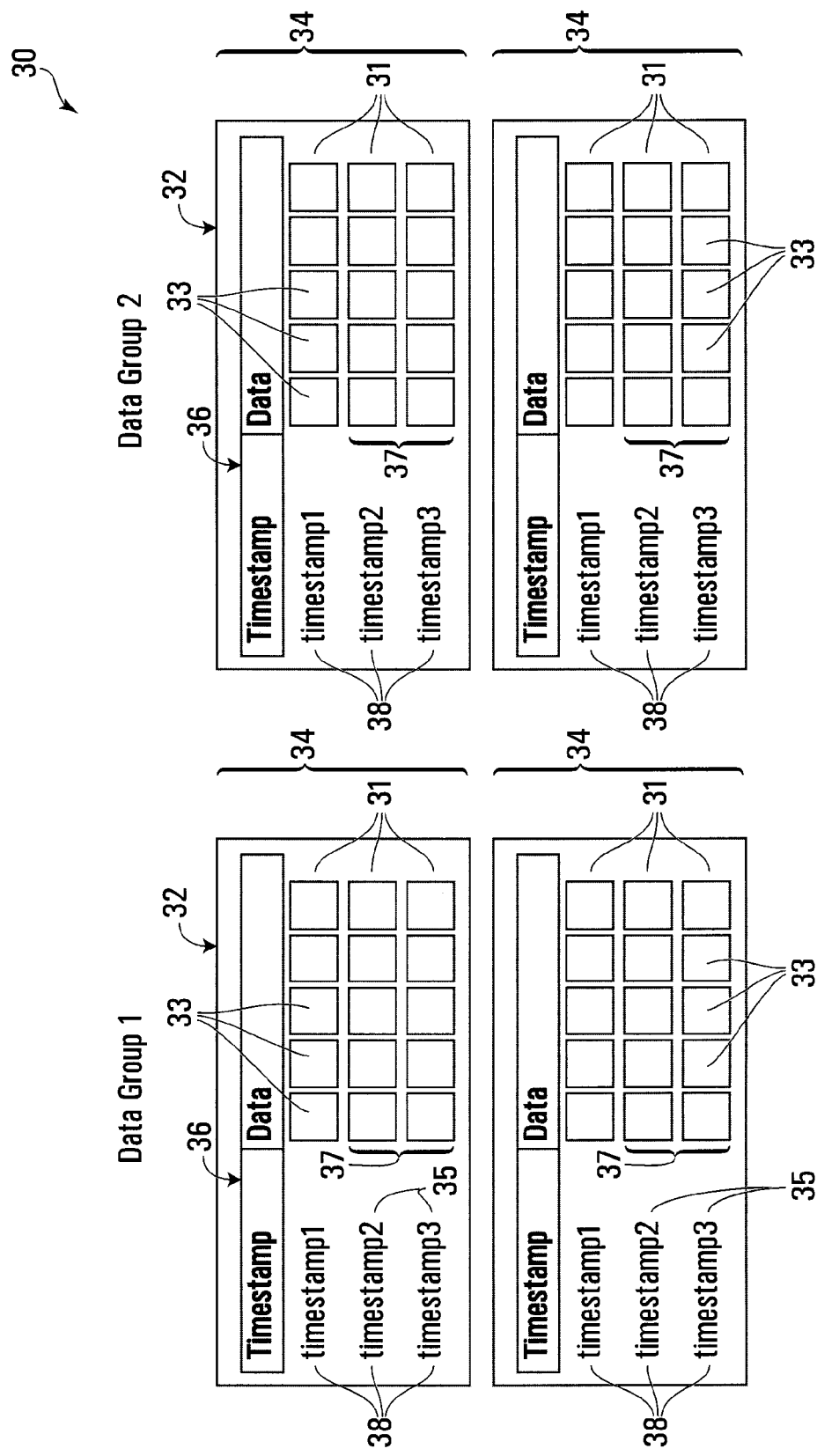
FIG. 2 is an example of a data structure for interferometric system data, in accordance with an embodiment of the disclosure.

Turning to FIG. 2, there is shown a data structure 30 according to which sensor data is stored in data repository 22. Data structure 30 is divided into a number of data groups 32 (two of which are shown in FIG. 2). Each data group 32 includes one or more data group members 34. In FIG. 2, each data group 32 is shown as including two data group members 34, although of course in other embodiments any number of data group members 34 may be comprised in each data group 32. Each data group 34 includes a timestamp array 36 comprising one or more timestamps 38. Each timestamp 38 is associated with a corresponding data array 31, each data array comprising a number of data blocks 33. Any number of data blocks 31 may be associated with a given timestamp 38. Thus, for each data group member 34, there are a number of data blocks 33 associated with each timestamp 38.

In the present embodiment, data structure 30 is described as including timestamp arrays 36 comprising timestamps 38. More generally, each timestamp array 36 may be referred to as a data parameter array, and each timestamp 38 may be referred to as a data parameter. In other embodiments, data structure 30 may comprise other types of data parameter arrays having other types of data parameters. For example, each data parameter array may comprise, in addition to or as an alternative to a timestamp array 36, a channel number array comprising one or more channel numbers. Each channel number may indicate a position along a pipeline or a wellbore, such as pipeline 12. However, in what follows, data structure 30 is only described in the context of timestamp arrays 36 and timestamps 38.

Each data group 32 comprises interferometric system data relating to a particular aspect of the pipeline monitoring. Furthermore, each data group member 34 comprises interferometric system data relating to a more particular aspect of the pipeline monitoring. For example, one of data groups 32 may comprise interferometric system data (in this example, event data) relating to alarms that have been triggered ("Alarm History"). In this case, each data group member 34 in the data group 32 may comprise event data relating to one or more of alarms triggered by leaks, human intrusions, heavy machinery, and pigging operations. Furthermore, each data block 33 within the particular data group 32 will comprise event data relating to alarms that have been triggered. As will be described in more detail below, there exists a wide variety of different aspects of the pipeline monitoring that may be categorised by data groups 32. In what follows, the interferometric system data shall be referred to in terms of sensor data, i.e. data obtained through use of the sensors adjacent pipeline 12.

Sensor data recorded by processing and relay system 16 is sent to server 18 via network 20, whereupon server 18 is configured to format the received sensor data into data blocks 33 and corresponding timestamps 38 shown in FIG. 2. In particular, server 18 attaches or otherwise associates a timestamp 38 to each data block 33 based on the point in time at which the sensor data comprised in the data block 33 was recorded by processing and relay system 16. Following formatting of the sensor data into data blocks 33 and corresponding timestamps 38, data blocks 33 are organized into their respective data arrays 31 according to their associated timestamps 38.

In order for one or more of local computing devices 24 to access the sensor data comprised in data repository 22, a local computing device 24 may initiate a query to sever 18. In one embodiment, the query comprises the following form:

Function [tile_data_struct, chart_handles]=update_tile (tile_name, time_start, time_end, summary_requested)

In the above query, tile_name indicates a particular data group 32, time_start and time_end indicate the start and end times of a monitoring period, and summary_requested indicates whether a summary of the sensor data is requested.

Upon receiving the query, server 18 accesses data structure 30 in data repository 22 and determines, using tile_name, the particular data group 32 identified in the function. The data group 32 identified in the function may be referred to as a target data group. Using time_start and time_end, server 18 also determines the particular timestamp or timestamps 38 identified by the function. In particular, the monitoring period defined by time_start and time_end in turn permits identification of a number of timestamps 38 that correspond to the monitoring period. For example, if tile_name indicates Data Group 1, and time_start and time_end indicate a monitoring period that encompasses timestamps 2 and 3, but not 1, then server will identify the target timestamps as being timestamps 35, as seen in FIG. 2.

Subsequently, server 18 determines, based on target timestamps 35, the data arrays 31 (which may be referred to as target data arrays) that correspond to target timestamps 35. Following from the above example, server 18 will identify the target data arrays as being data arrays 37, as seen in FIG. 2. Server 18 then extracts the sensor data from the data blocks 33 comprised in target data arrays 37. Server 18 then processes the sensor data into a format suitable for sending to local computing device 24, instead of sending the sensor data itself which may be large in size. The processed sensor data (e.g. text data or graphs) is then sent to the requesting local computing device 24, via network 26, using parameter tile_data_struct in the function.

The parameter summary_requested may be set to 0 or 1, depending on whether the user is requesting a summary of sensor data or more detailed sensor data. If summary_requested is set to 1, the sensor data comprised in target data arrays 37 is pre-processed prior to being sent to local computing device 24. For example, server 18 may determine one or more averages of data comprised in one or more data blocks of target data arrays 37. In particular, the sensor data comprised in each data block 33 of target data arrays 37 may have a value associated with it, and server 18 may determine an average of the values in each target data array 37. In some embodiments, in order for summary data to be provided, a minimum number of data blocks in a target data array may be required. In such a case, server 18 may first determine whether the number of data blocks 33 in the target data array meets a threshold, and if not then the sensor data comprised in the data blocks of that target data array are not pre-processed and are not sent to local computing device 24.

In some embodiments, server 18 may process the sensor data comprised in target data arrays 37 prior to transmitting the sensor data to local computing device 24. Alternatively, local computing device 24 may process the sensor data. Processing the sensor data may comprise preparing the sensor data in a form suitable for display on a graphical user interface of local computing device 24. For example, function update_tile may generate graphs or other plots comprising sensor data and may send the handles chart_handles so that they can be displayed on the graphical user interface.

Figure 3:
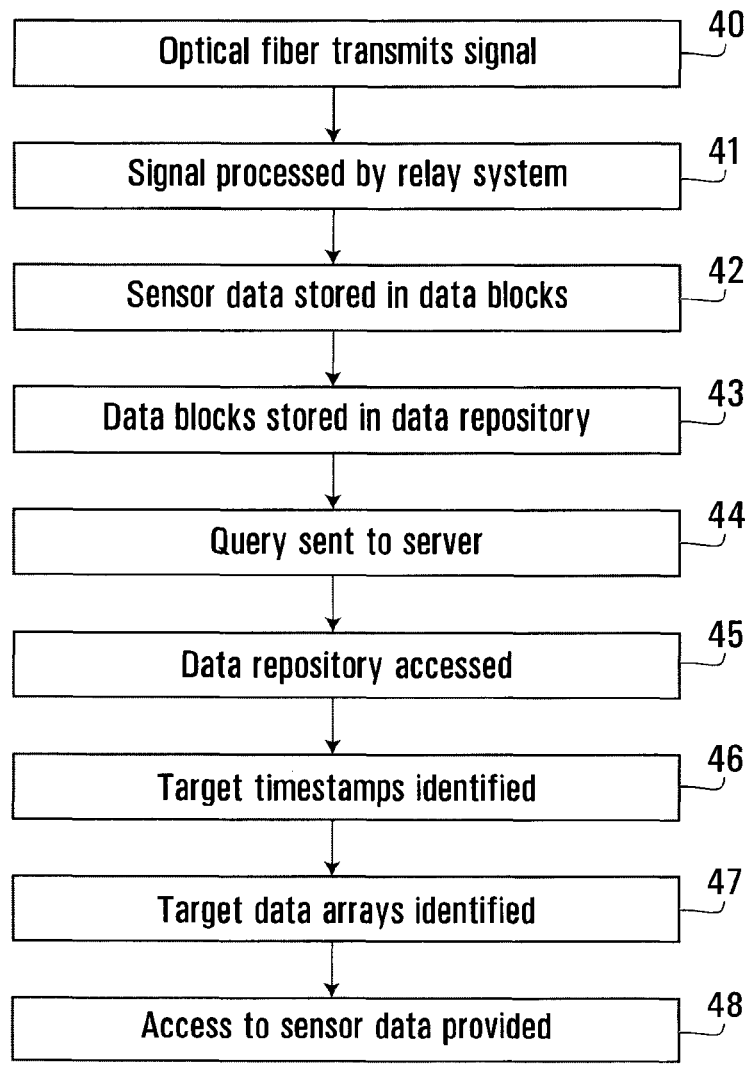
FIG. 3 is a flowchart of a method of providing access to, and updating, interferometric system data, in accordance with an embodiment of the disclosure.

Turning to FIG. 3, there is shown a method of providing sensor data to a local computing device, and updating the sensor data in a data repository, according to an embodiment of the disclosure. At step 40, optical fiber segments 14 transmit raw data monitored from pipeline 12 to processing and relay system 16. At step 41, processing and relay system 16 processes the raw data received from optical fiber segments 14. Processing the data may comprise extracting sensor data from the raw data. The raw data may comprise raw interferometry data obtained from optical fiber segments 14, and the sensor data may comprise data inferred or otherwise derived from the raw data. A step 42, the sensor data is packaged into data blocks 33 and associated timestamps 38. In particular, processing and relay system 16 may determine from the sensor data the time at which specific portions of the sensor data were monitored by optical fiber segments 14. This information is converted into a timestamp 38 which is associated with the data blocks 33 comprising the relevant sensor data. At step 43, data blocks 33 and associated timestamps 38 are transmitted to backend server 18 via network 20, and stored in data repository 22 according to data structure 30 described above in connection with FIG. 2. In alternative embodiments, processing and relay system 16 may act merely as a relay device, and may transmit the sensor data directly to server 18 whereupon server 18 executes step 42 and packages the sensor data into data blocks 33 and associated timestamps 38. In still further embodiments, processing and relay system 16 may transmit the raw data, received from optical fiber segments 14, directly to server 18 whereupon server 18 executes steps 41 and 42 and processes the raw data into the sensor data, and packages the sensor data into data blocks 33 and associated timestamps 38.

The data structure 30 in data repository 22 may be continually updated through communication between processing and relay system 16 and backend server 18. If two-way communication is enabled, then server 18 may query processing and relay system 16 to determine whether new sensor data has been recorded. If so, then processing and relay system 16 may transmit the new sensor data to server 18, using network 20. Alternatively, if only one-way communication is enabled, then processing and relay system 16 may periodically transmit new sensor data to server 18, whereupon sever 18 updates data structure 30 with the new sensor data. New sensor data may refer to sensor data not already stored in data repository.

In order to gain access to the sensor data, a user may initiate communication with server 18 using a local computing device 24. At step 44, local computing device 24 sends a query to server 18, using network 26. The query is used for accessing sensor data stored in data repository 22, and includes at least a monitoring period identifier and a data group identifier. For example, the monitoring period identifier may comprise the time_start and time_end parameters indicated above, and the data group identifier may comprise the tile_name parameter identified above. At step 45, server 18 receives the query and access data repository 22 in which is stored the sensor data according to data structure 30. At step 46, server 18 uses the data group identifier to determine one or more target groups from among data groups 32 stored in data repository 22. In addition, server 18 uses the monitoring period identifier to determine one or more target timestamps from among timestamps 38 comprised in the target data groups. At step 47, based on the one or more target timestamps comprised in the one or more target groups, server 18 identifies the data array corresponding to each target timestamp. At step 48, server 18 extracts the sensor data from the target data arrays. Server 18 preferably formats or pre-processes the sensor data such that it is ready for display on a graphical user interface, such as a graphical user interface of the local computing device 24. Server 18 then sends the formatted data to local computing device 24. Alternatively, the sensor data may be sent directly to local computing device 24 where it is formatted appropriately at local computing device 24.

Figure 4:
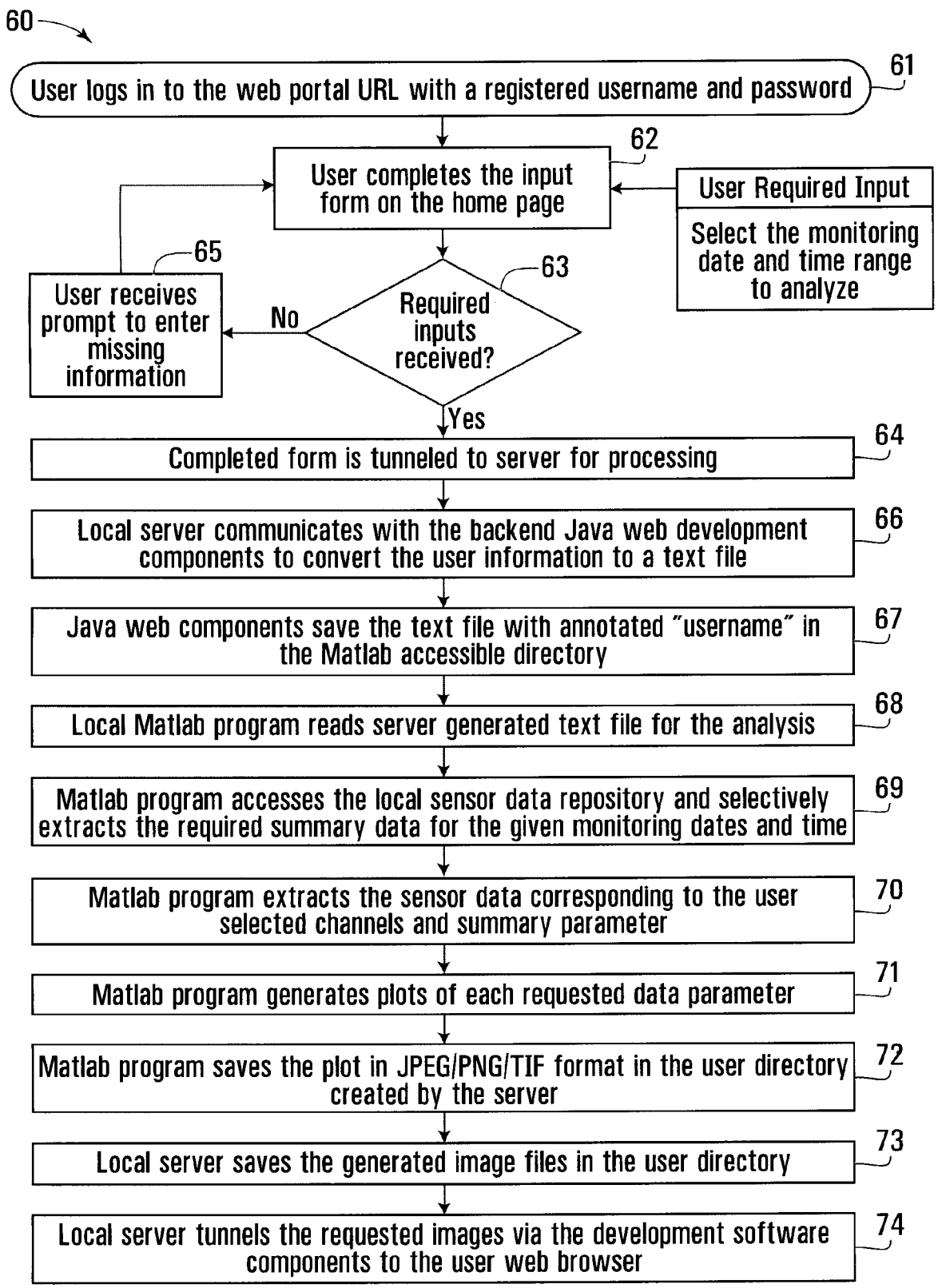
FIG. 4 is a flowchart of a method of providing access to interferometric system data, in accordance with an embodiment of the disclosure.
Figure 5:
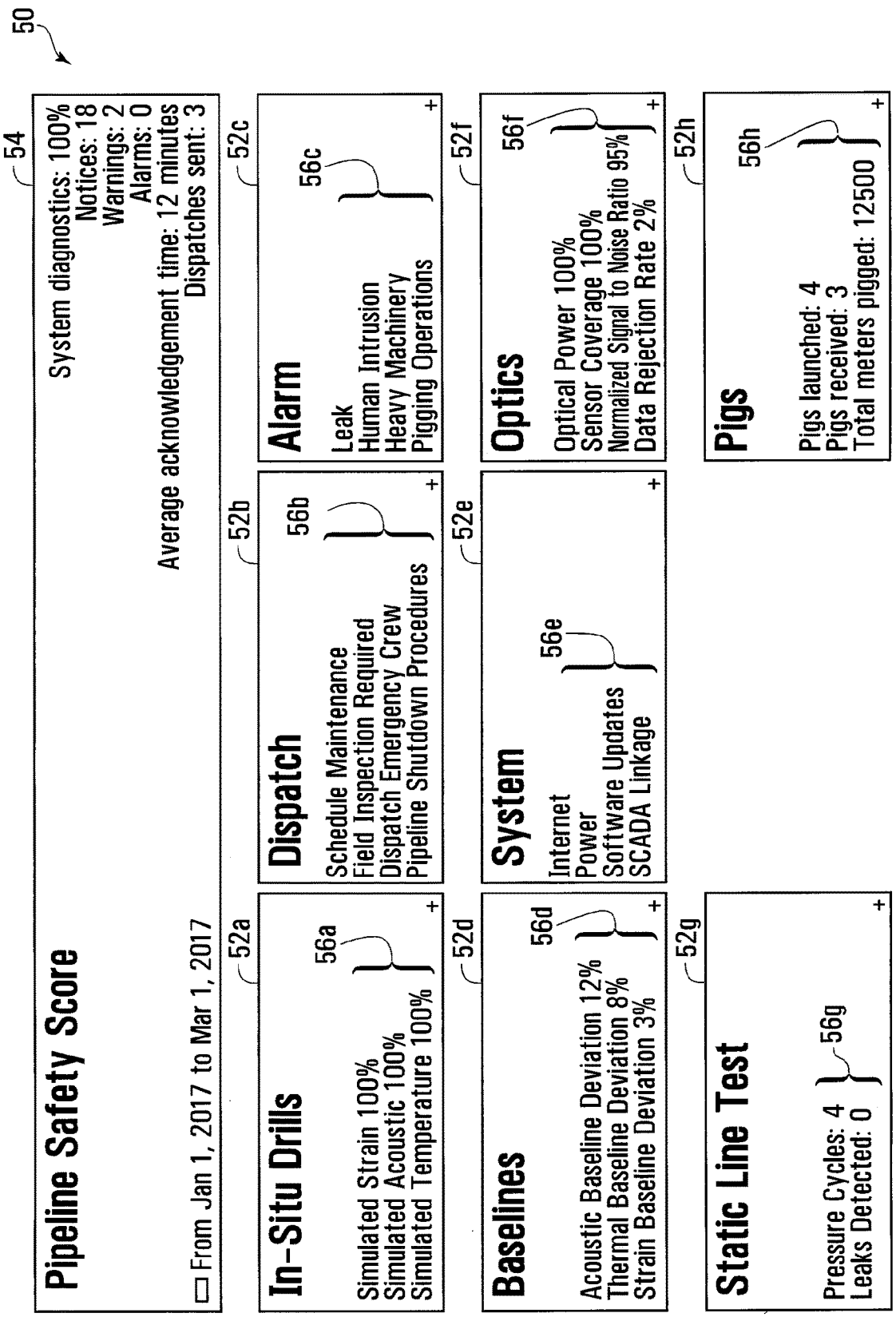
FIG. 5 is an example of a graphical user interface for accessing interferometric system data, in accordance with an embodiment of the disclosure.

Turning to FIG. 4, there is shown a more detailed method 60 of providing access to sensor data, according to an embodiment of the disclosure. At step 61, a user logs in to a web portal URL using one or more login credentials, such as a username and associate password. For example, the user may use one of local computing devices 24 to access the web portal URL. At step 62, the user is directed to a home page wherein the user completes an input form. The input form includes a monitoring period identifier, and optionally a data group identifier. At step 63, a check is carried out to determine whether all required inputs have been received. If yes, then the method proceeds to step 64. If not, then the method proceeds to step 65 where the user is prompted to enter the missing information.

At step 64, the completed input form is tunnelled to server 18 for processing. At step 66, server 18 communicates with backend Java web development components to convert the input form to a text file. At step 67, the Java web components save the text file in a Matlab-accessible directory. At step 68, a local Matlab program reads the server-generated text file. At steps 69 and 70, the Matlab program accesses and extracts the requested sensor data, as explained above. For example, the Matlab program may use the data group identifier in the text file to determine one or more target groups from among data groups 32 stored in data repository 22. In addition, the Matlab program may use the monitoring period identifier in the text file to determine one or more target timestamps from among timestamps 38 comprised in the target data groups. Based on the one or more target timestamps comprised in the one or more target groups, the Matlab program may identify the data array corresponding to each target timestamp. The Matlab program then extracts the sensor data from the target data arrays. The extracted sensor data may be pre-processed so as to be presented in a summary format, also as explained above.

At step 71, the Matlab program may generate one or more plots based on the extracted sensor data. At steps 72 and 73, the Matlab program saves the one or more plots in the user directory created by server 18. At step 74, server 18 tunnels the one or more plots to the user's web browser, whereupon the user may view the plots on local computing device 24.

Method 60 shown in FIG. 4 is merely an exemplary method providing access to sensor data, and the order of the steps and/or the number of steps may be changed without departing from the scope of the disclosure. Furthermore, software applications other than Matlab may be used, and the application could be developed in any other suitable environment such as C, C++, C#, Java, etc.

In alternative embodiments, data structure 30 may be hosted directly on a local computing device 24. In such a case, local computing device 24 is configured to communicate directly with processing and relay system 16, and receive sensor data directly from processing and relay system 16. Furthermore, data structure 30 would be stored on a data repository of local computing device 24. A user may then access the sensor data by using local computing device 24 to access its data repository directly, in the manner described above. In other embodiments, processing and relay system 16 may itself comprise a data repository and sufficient processing power to enable it to store data structure 30. A user may then access the sensor data by communicating directly with processing and relay system 16 (for example by interfacing directly with processing and relay system 16). An advantage of the embodiment shown in FIG. 1 is that processing and relay system 16 and server 18 handle the relatively power-intensive tasks of recording the sensor data, formatting the sensor data into data blocks and timestamps, storing the data blocks and timestamps according to the data structure, and extracting the sensor data in response to a query sent from a local computing device 24. On the other hand, local computing device 24 which may have limited connectivity, bandwidth and processing power, may still be able to access the sensor data by issuing a simple query to server 18.

Turning to FIGS. 5 and 6A-6D, there are shown views of a graphical user interface 50, illustrating how sensor data may be displayed for a user. Graphical user interface (GUI) 50 may be designed using any one of various commercially-available design packages, such as MATLAB, C#, or Labview. GUI 50 comprises a number of tiles 52*a-h* and a banner 54. Each tile 52*a-h* displays sensor data obtained from a different one of data groups 32. Each tile 52*a-h* includes a number of tile members 56*a-h*. Each tile member 56*a-h* displays sensor data obtained from a different one of data group members 34. In the present embodiment, tiles 52*a-h* include an in-situ drills tile 52*a*, a dispatch tile 52*b*, an alarm tile 52*c*, a baselines tile 52*d*, a system tile 52*e*, an optics tile 52*f*, a static line test tile 52*g*, and a pigs tile 52*h*. Tiles 52*a-h* may be rearranged by the user, and more or fewer tiles may be displayed (as can be seen by comparing FIG. 5 with FIGS. 6A-6D).

Each tile 52*a-h* displays information relating to a particular aspect of the monitoring of the pipeline or wellbore. For example, the information could relate to sensor data, diagnostic data, and/or event data. When a user wishes to obtain more detailed information relating to a particular tile, the user may initiate a query to server 18 for example by clicking on that tile. Clicking on a tile causes a query to be generated at local computing device 24 and issued to server 18. The query includes a data group identifier identifying the particular tile that has been clicked. The query also includes a monitoring period identifier identifying a period of interest specified by the user initiating the query (the user may be prompted to indicate the period of interest following clicking on the tile). As described above, the query causes sever 18 to access data repository 22 for retrieval of the requested sensor data. Using the data group identifier and monitoring period identifier, server 18 determines one or more target timestamps and one or more data arrays 31 corresponding to the one or more target timestamps. The sensor data from the one or more target data arrays 31 is formatted by server 18, and the formatted sensor data is sent to local computing device 24 for display on GUI 50.

Figure 6A:
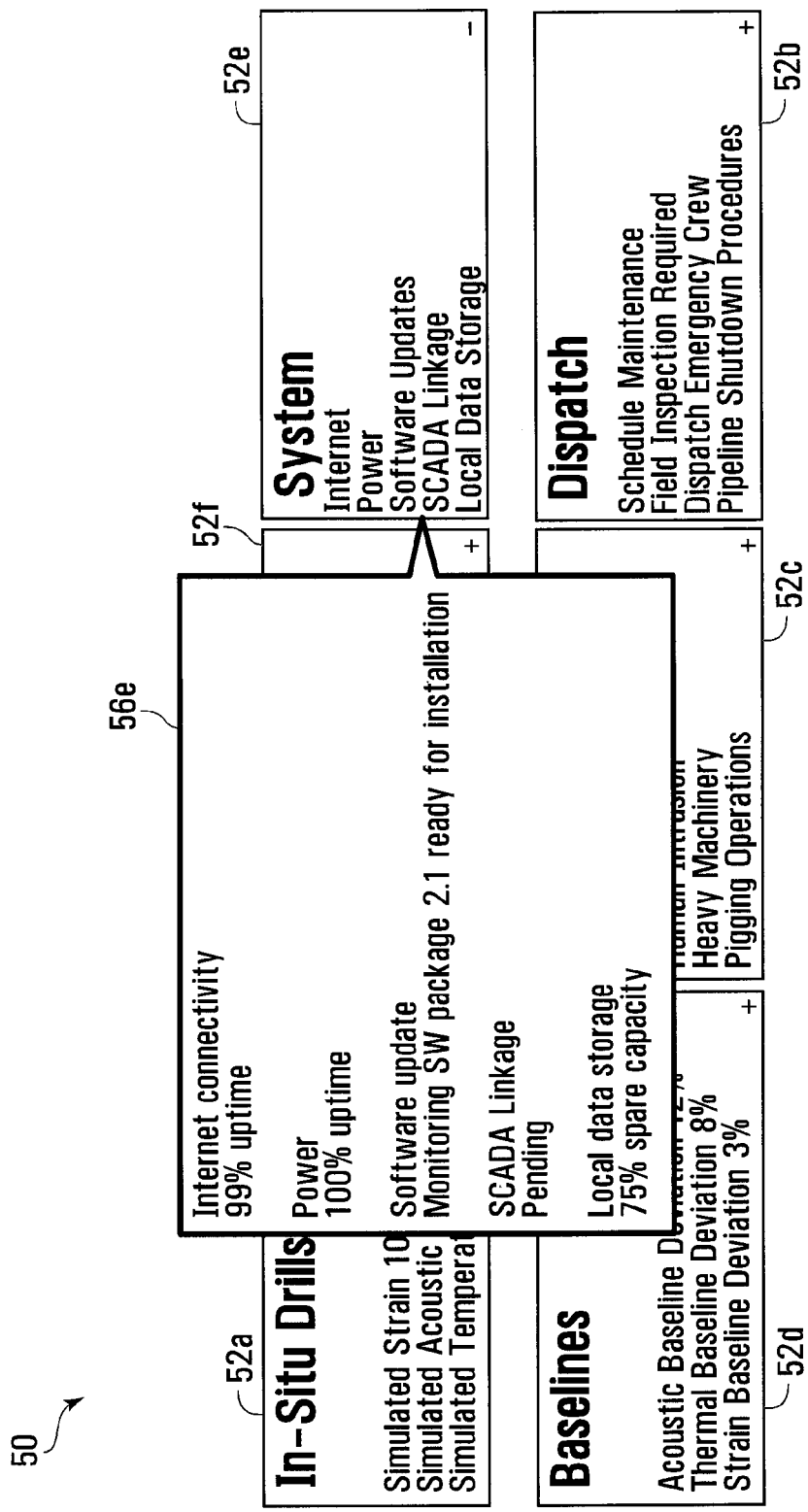
FIGS. 6A-6D are examples of a graphical user interface for accessing interferometric system data, in accordance with embodiments of the disclosure.
Figure 6B:
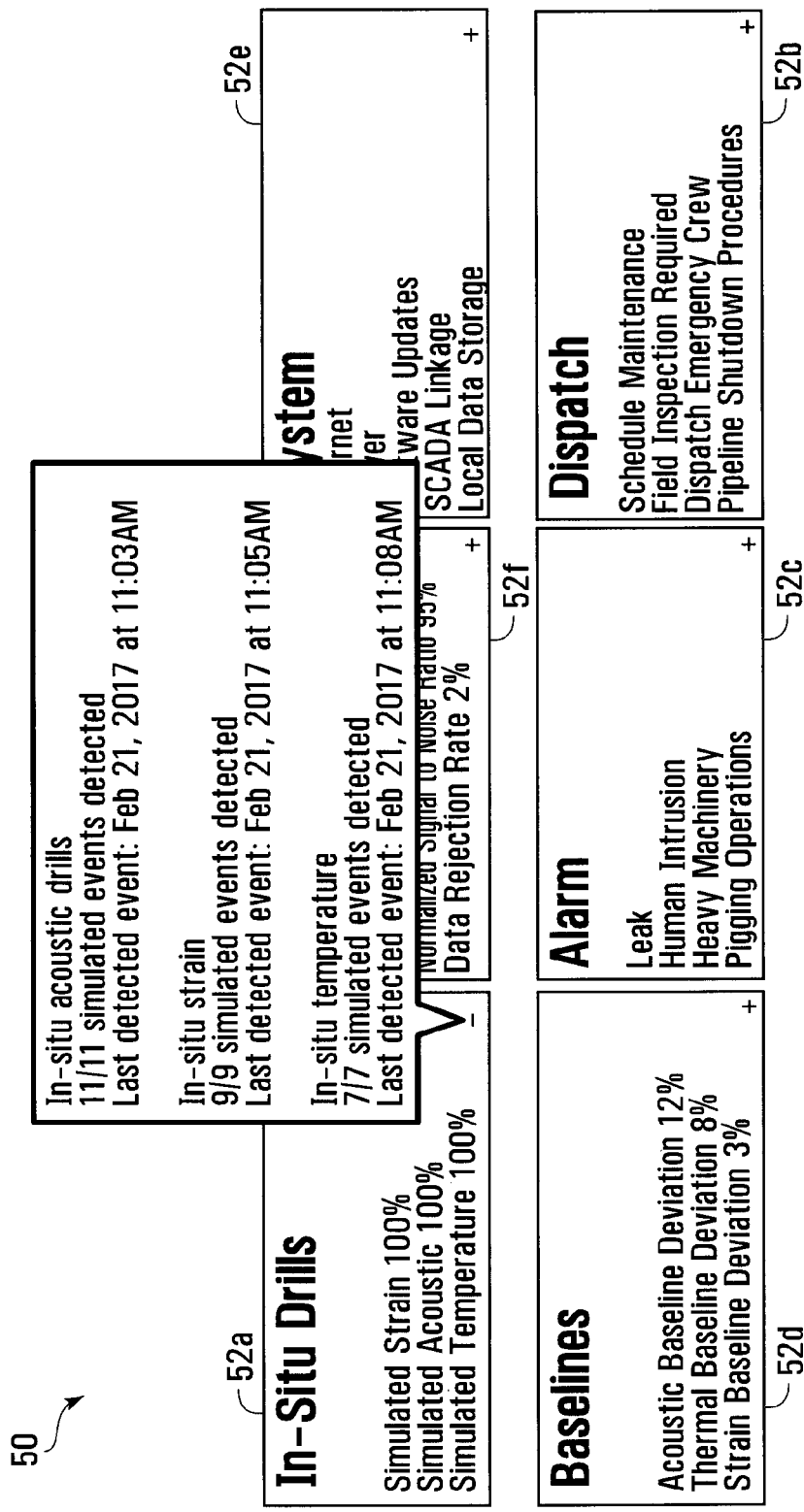
Figure 6C:
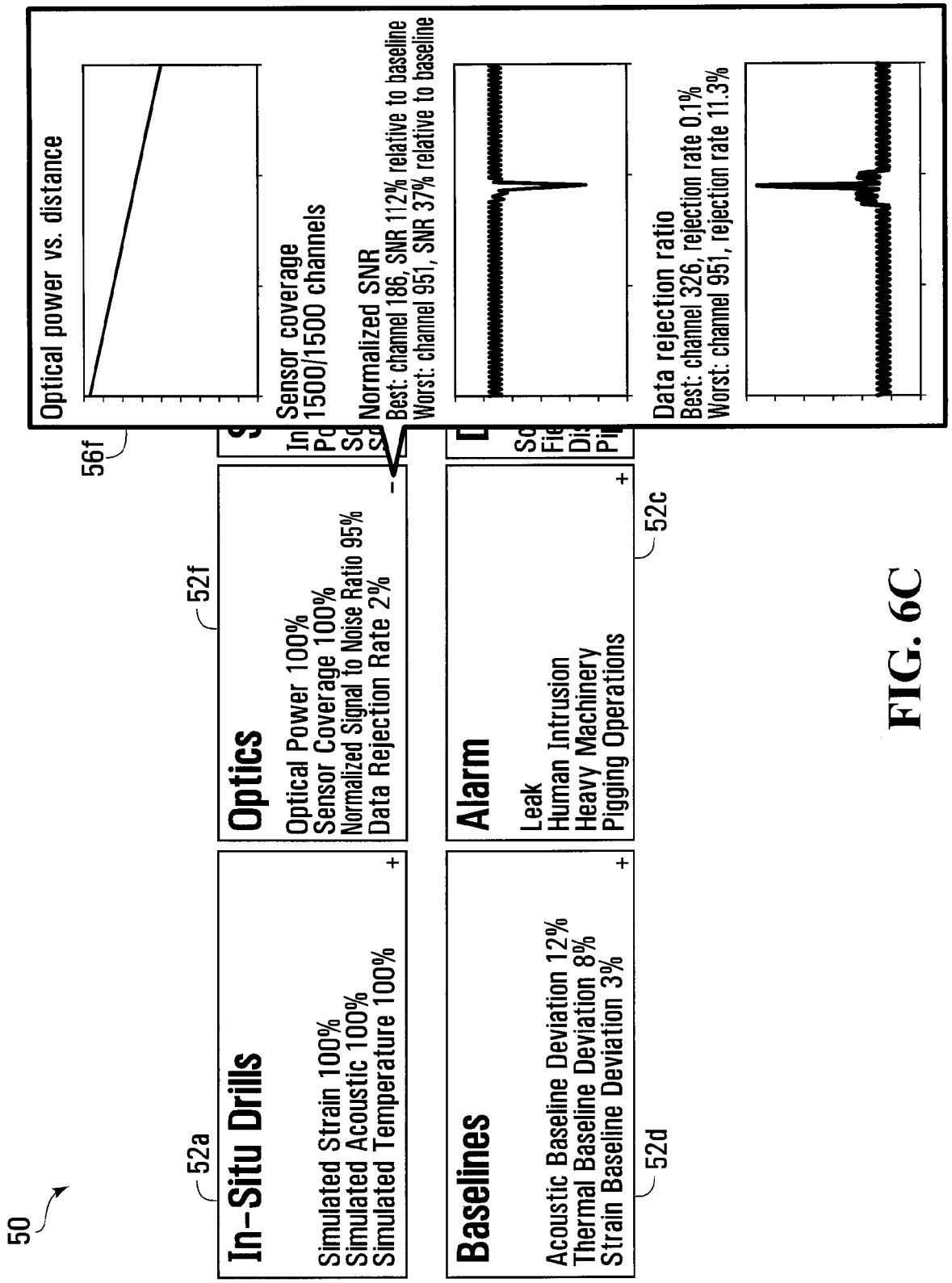
Figure 6D:
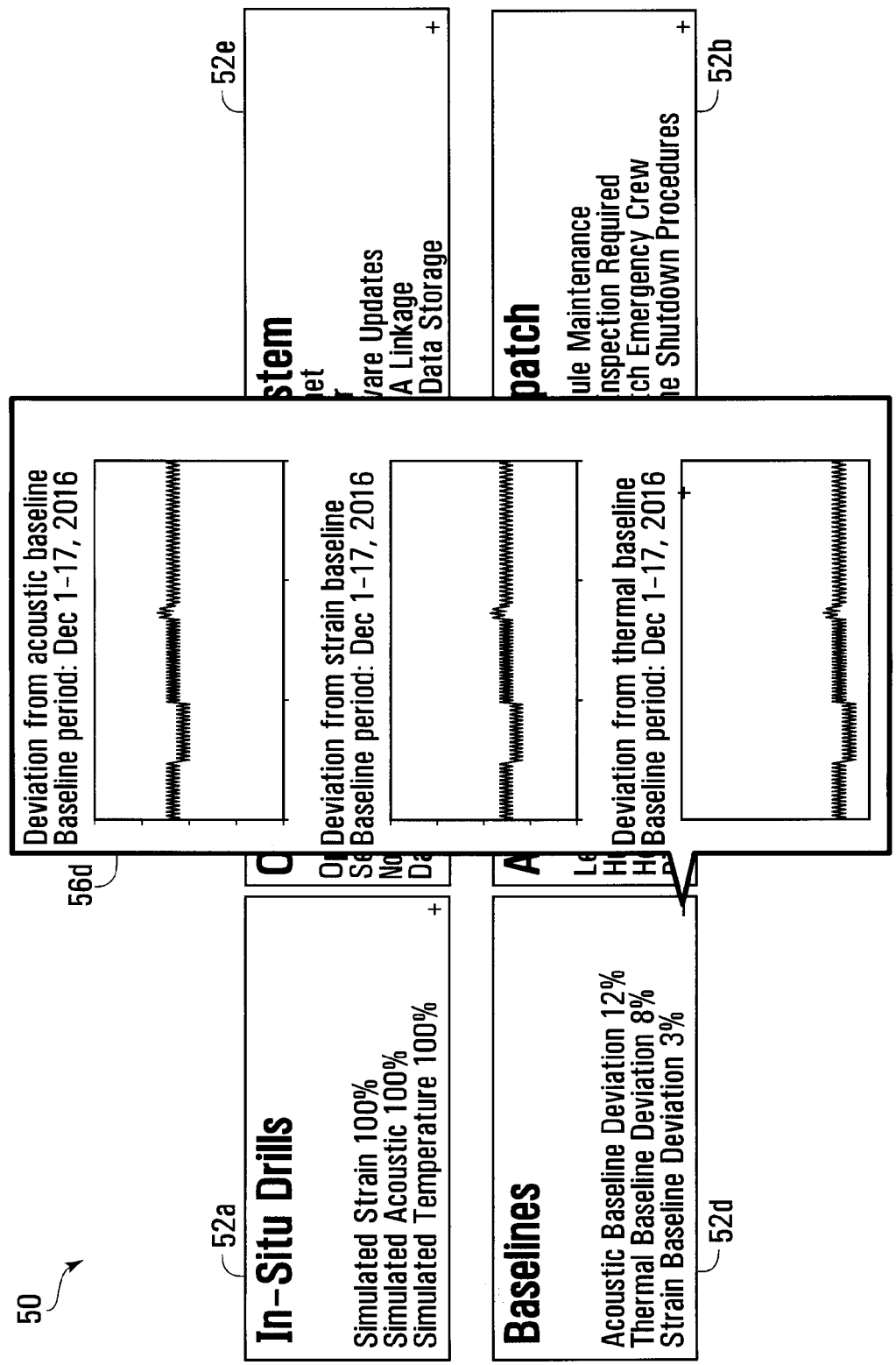

An example of formatted sensor data displayed on GUI 50 is shown in FIGS. 6A-6D. For example, in FIG. 6A, formatted sensor data 56*e* is displayed overlaid tile 52*f*, in response to user clicking on tile 52*e*. In FIG. 6B, formatted sensor data 56*a* is displayed overlaid tiles 52*a* and 52*f*, in response to user clicking on tile 52*a*. In FIG. 6C, formatted sensor data 56*f* (comprising graphs of optical power per distance, normalized signal-to-noise ratio, and data rejection ratio) is displayed, in response to user clicking on tile 52*f*. Finally, in FIG. 6D, formatted sensor data 56*d* is displayed, in response to user clicking on tile 52*d*.

One or more example embodiments have been described by way of illustration only. This description has been presented for purposes of illustration and description, but is not intended to be exhaustive or limited to the form disclosed. Many modifications and variations will be apparent to those of ordinary skill in the art without departing from the scope of the claims. It will be apparent to persons skilled in the art that a number of variations and modifications can be made without departing from the scope of the claims. For example, while the disclosure has been presented in the context of parameter arrays that may include either or both of timestamp arrays and channel number arrays, other parameter arrays may be included in the data structure. It is furthermore contemplated that any part of any aspect or embodiment discussed in this specification can be implemented or combined with any part of any other aspect or embodiment discussed in this specification.

The invention claimed is:

1. A performing optical fiber interrogation of one or more wellbores or one or more pipelines, comprising:
   using an optical fiber interrogator to monitor data from the one or more wellbores or the one or more pipelines by interrogating optical fiber positioned within acoustic proximity of the one or more wellbores or the one or more pipelines, wherein interrogating the optical fiber comprises:
   transmitting light pulses along the optical fiber; and
   receiving reflections of the light pulses; and
   using one or more computer processors to:
   extract phase data from the reflections;
   generate, based on the phase data, interferometric system data as a function of corresponding data parameters, each data parameter comprising a timestamp or a channel number indicating a position along the one or more wellbores or the one or more pipelines;
   format the interferometric system data into data blocks; and
   store the data blocks and corresponding data parameters in a data repository according to a data structure comprising one or more data parameter arrays and one or more corresponding data group members, each data group member comprising one or more data arrays each associated with a data parameter in the corresponding data parameter array, wherein each data array comprises one or more of the data blocks.

2. The method of claim 1, wherein each data parameter array comprises a timestamp array having one or more timestamps, and wherein each data parameter comprises one of the one or more timestamps.

3. The method of claim 1, wherein each data parameter array comprises a channel number array having one or more channel numbers, and wherein each data parameter comprises one of the one or more channel numbers, each channel number indicating a position.

4. The method of claim 1, wherein the data structure further comprises one or more timestamp arrays and one or more channel number arrays, wherein:
   each timestamp array has one or more timestamps, and wherein each data parameter comprises one of the one or more timestamps; and
   each channel number array has one or more channel numbers, and wherein each data parameter comprises one of the one or more channel numbers, each channel number indicating a position.

5. The method of claim 1, further comprising, prior to formatting the interferometric system data, sending the interferometric system data to one or more servers, wherein the steps of formatting the interferometric system data, and storing the data blocks and corresponding data parameters, are carried out by the one or more servers.

6. The method of claim 1, further comprising, prior to storing the data blocks and corresponding data parameters, sending the data blocks and corresponding data parameters to one or more servers, wherein the steps of formatting the data, and storing the data blocks and corresponding data parameters, are carried out by the one or more servers.

7. The method of claim 1, wherein the step of formatting the interferometric system data, or the step of sending the data blocks and the corresponding data parameters, is carried out periodically.

8. The method of claim 1, further comprising using one or more computer processors to determine whether the optical fiber has monitored new data from the one or more wellbores or the one or more pipelines.

9. The method of claim 1, wherein the interferometric system data comprises one or more of:
   event data comprising data relating to one or more events detected at the one or more wellbores or the one or more pipelines; and
   diagnostic data comprising data relating to the optical fiber interrogator.

10. A system for-performing optical fiber interrogation of one or more wellbores or one or more pipelines, comprising:
    optical fiber positioned within acoustic proximity of the one or more wellbores or the one or more pipelines, for monitoring data from the one or more wellbores or the one or more pipelines;

an optical fiber interrogator coupled to the optical fiber a data repository; and one or more processors configured to:
control the optical fiber interrogator to cause light pulses to be transmitted along the optical fiber;
extract phase data from reflections of the light pulses received at the optical fiber interrogator;
generate, based on the phase data, interferometric system data as a function of corresponding data parameters, each data parameter comprising a timestamp or a channel number indicating a position along the one or more wellbores or the one or more pipelines;
format the interferometric system data into data blocks; and
store the data blocks and corresponding data parameters in the data repository according to a data structure comprising one or more data parameter arrays and one or more corresponding data group members, each data group member comprising one or more data arrays each associated with a data parameter in the corresponding data parameter array, wherein each data array comprises one or more of the data blocks.

11. The system of claim 10, wherein each data parameter array comprises a timestamp array having one or more timestamps, and wherein each data parameter comprises one of the one or more timestamps.

12. The system of claim 10, wherein each data parameter array comprises a channel number array having one or more channel numbers, and wherein each data parameter comprises one of the one or more channel numbers, each channel number indicating a position.

13. The system of claim 10, wherein the data structure comprises one or more timestamp arrays and one or more channel number arrays, wherein:
each timestamp array has one or more timestamps, and wherein each data parameter comprises one of the one or more timestamps; and
each channel number array has one or more channel numbers, and wherein each data parameter comprises one of the one or more channel numbers, each channel number indicating a position.

14. The system of claim 10, wherein the interferometric system data comprises one or more of:
event data comprising data relating to one or more events detected at the one or more wellbores or the one or more pipelines; and
diagnostic data comprising data relating to the optical fiber interrogator.

15. A system for performing optical fiber interrogation of one or more wellbores or one or more pipelines comprising:
optical fiber positioned within acoustic proximity of the one or more wellbores or the one or more pipelines and configured to monitor data from one or more pipelines or one or more wellbores;
an optical fiber interrogator coupled to the optical fiber;
a data repository;
one or more remote computer processors configured to:
control the optical fiber interrogator to cause light pulses to be transmitted along the optical fiber;
extract phase data from reflections of the light pulses received at the optical fiber interrogator;
generate, based on the phase data, interferometric system data as a function of corresponding data parameters, each data parameter comprising a timestamp or a channel number indicating a position along the one or more wellbores or the one or more pipelines;
format the interferometric system data into data blocks; and
store the data blocks and corresponding data parameters in the data repository according to a data structure comprising one or more data parameter arrays and one or more corresponding data group members, each data group member comprising one or more data arrays each associated with a data parameter in the corresponding data parameter array, wherein each data array comprises one or more of the data blocks;
a local computing device communicatively coupled to the one or remote computer processors and configured to send to the one or more remote computer processors a query for accessing the interferometric system data, wherein the query comprises a data parameter identifier,
wherein the one or more remote computer processors are further configured to:
determine, using the data parameter identifier, one or more target data parameters from among the one or more data parameter arrays;
determine one or more target data arrays from among the one or more data arrays, the one or more target data arrays corresponding to the one or more target data parameters; and
extract the interferometric system data comprised in the one or more target data arrays.

16. The system of claim 15, wherein each data parameter array comprises a timestamp array having one or more timestamps, and wherein each data parameter comprises one of the one or more timestamps.

17. The system of claim 15, wherein each data parameter array comprises a channel number array having one or more channel numbers, and wherein each data parameter comprises one of the one or more channel numbers, each channel number indicating a position.

18. The system of claim 15, wherein the interferometric system data comprises one or more of:
event data comprising data relating to one or more events detected at the one or more wellbores or the one or more pipelines; and
diagnostic data comprising data relating to the optical fiber interrogator.

19. The system of claim 15, wherein the data structure further comprises one or more timestamp arrays and one or more channel number arrays, wherein:
each timestamp array has one or more timestamps, and wherein each data parameter comprises one of the one or more timestamps; and
each channel number array has one or more channel numbers, and wherein each data parameter comprises one of the one or more channel numbers, each channel number indicating a position.

* * * * *